United States Patent
Clark et al.

(10) Patent No.: US 10,144,835 B2
(45) Date of Patent: Dec. 4, 2018

(54) OXIDIZED ALPHA-OLEFINS IN RUST PREVENTIVE COATINGS

(71) Applicant: The Lubrizol Corporation, Wickliffe, OH (US)

(72) Inventors: Jennifer E. Clark, Reminderville, OH (US); Ben Faber, Cleveland Heights, OH (US); Gregory E. Moran, Painesville, OH (US); Britt A. Minch, Painesville Township, OH (US); David Boothe, Mentor, OH (US); Hannah Greenfield, Derby (GB); Pedro J. Velis, Coquimbo (CL); David J. Moreton, Milford (GB)

(73) Assignee: The Lubrizol Corporation, Wickliffe, OH (US)

(*) Notice: Subject to any disclaimer, the term of this patent is extended or adjusted under 35 U.S.C. 154(b) by 0 days.

(21) Appl. No.: 15/536,304

(22) PCT Filed: Dec. 14, 2015

(86) PCT No.: PCT/US2015/065551
§ 371 (c)(1),
(2) Date: Jun. 15, 2017

(87) PCT Pub. No.: WO2016/100206
PCT Pub. Date: Jun. 23, 2016

(65) Prior Publication Data
US 2017/0362444 A1 Dec. 21, 2017

Related U.S. Application Data

(60) Provisional application No. 62/091,692, filed on Dec. 15, 2014.

(51) Int. Cl.
*C09D 5/08* (2006.01)
*C09D 7/00* (2018.01)
*C08K 5/42* (2006.01)
*C08K 5/09* (2006.01)
*C09D 7/65* (2018.01)
*C09D 7/63* (2018.01)
*C09D 7/20* (2018.01)

(52) U.S. Cl.
CPC ............ *C09D 5/086* (2013.01); *C08K 5/09* (2013.01); *C08K 5/42* (2013.01); *C09D 5/08* (2013.01); *C09D 7/63* (2018.01); *C09D 7/65* (2018.01); *C09D 7/20* (2018.01)

(58) Field of Classification Search
CPC ...... C09D 5/086; C09D 7/125; C09D 7/1233; C09D 7/001; C08K 5/09; C08K 5/42
See application file for complete search history.

(56) References Cited

U.S. PATENT DOCUMENTS

| | | | | |
|---|---|---|---|---|
| 2009/0018188 A1* | 1/2009 | Texter | ............... | A01N 41/04 514/495 |
| 2013/0005626 A1* | 1/2013 | Breitzke | ............... | C11D 1/22 508/390 |

FOREIGN PATENT DOCUMENTS

| | | |
|---|---|---|
| AU | 2011311628 A1 | 4/2013 |
| WO | 2012/045713 A1 | 4/2012 |
| WO | 2013/023021 A1 | 2/2013 |
| WO | 2015/094942 A1 | 6/2015 |
| WO | WO 2015/094942 A1 * 6/2015 | ............... C08J 7/04 |

* cited by examiner

*Primary Examiner* — Robert D. Harlan
(74) *Attorney, Agent, or Firm* — Michael Miller; David Shold

(57) ABSTRACT

A coating composition comprising an oxidized α-olefin having 16 to 40 carbon atoms and one or more carboxylic acid or ester groups; a hydrocarbon-soluble ester-containing polymer having at least one branch of 10 to 36 carbon atoms and having a number average molecular weight of 5000 to 300,000; a carboxylic acid of at least 10 carbon atoms; a salt of an alkylarylsulfonic acid; an oil in an amount sufficient to dissolve said metal salt; and optionally, a volatile diluent, provides good rust protection.

15 Claims, No Drawings

OXIDIZED ALPHA-OLEFINS IN RUST PREVENTIVE COATINGS

CROSS REFERENCE TO RELATED APPLICATION

This application claims priority from PCT Application Serial No. PCT/US2015/065551 filed on Dec. 14, 2015, which claims the benefit of U.S. Provisional Application No. 62/091,692 filed on Dec. 15, 2014, both of which are incorporated in their entirety by reference herein.

BACKGROUND

The disclosed technology relates to corrosion- or rust-preventive coating compositions and methods of their use (rust being considered a form of corrosion). The compositions comprise an oxidized α-olefin, an ester-containing polymer, a carboxylic acid, and a salt of an alkylarylsulfonic acid, optionally with a volatile diluent.

Rust preventive coatings have been known to comprise a mineral (hydrocarbon) wax in a solvent or other liquid medium. Such coatings have been applied to metal surfaces, especially ferrous surfaces, as a rust preventative. They may be distinguished from other types of coatings such as paints in that the wax-containing coatings are often of a relatively temporary nature, imparting rust inhibition over a term of days or perhaps years, and in some instances being removed prior to further treatment of or working with the metal surface.

Coating and anti-rust compositions are known. For instance, U.S. Pat. No. 4,426,229, Bolton et al., Jan. 17, 1984, discloses oxidized alpha-olefin waxes. In an example, an oxidized C30+ alpha olefin is substituted in a floor polish formulation for unoxidized C30+ Alpha olefin and the resulting film was tough and cohesive.

U.S. Publication 2007/0095723, Baralt et al., May 3, 2007, discloses an oxidized olefin wax useful as a pour point depressant in a hydrocarbon composition.

U.S. Publication 2013/0068134, Yang et al., Mar. 21, 2013, discloses oxidized alphaolefins. Oxidized hydrocarbon waxes may have improved hardness or viscosity. The hardness of waxes is said to be a performance criterion in applications such as polishing, coating, and others.

WO 2013/134062, Lubrizol, Sep. 12, 2013, discloses waterborne coatings that provide improved corrosion protection. The composition may include water, a polymer resin component, and a corrosion inhibiting component comprising a first complexing agent comprising a trialkanol amine and a second complexing agent comprising a carboxylic acid.

GB 1 249 144, Esso Research and Engineering Company, Oct. 6, 1971, discloses an organic rust inhibiting composition comprising an aqueous ammonia gelled overbased alkaline earth metal sulfonate, a coating material which is a hydrocarbon polymer resin or a mixture of a hydrocarbon polymer resin, wax, and ethylene-vinyl acetate copolymer, and a hydrocarbon solvent.

U.S. Pat. No. 6,312,509, Moradian, Nov. 6, 2001, discloses a rust preventive coating composition including a microcrystalline wax, naphthenic and paraffinic oils, oils-soluble alkali-metal sulfonate, or other components.

EP 1 038 933, Kawasaki Steel Corporation, Sep. 7, 2000, discloses a coating composition comprising a methacrylic resin prepared by copolymerizing styrene or a substituted styrene, a methacrylic ester, and an olefinic compound having at least one carboxylic group.

It would be desirable obtain a wax for a coating composition which provides very good rust inhibiting performance, including at least one of good film integrity, good salt-spray performance, and few premature failures.

SUMMARY

The disclosed technology provides a coating composition comprising: (a) an oxidized α-olefin having 16 to 40 carbon atoms, said oxidized α-olefin comprising one or more carboxylic acid groups or C1-C28 alkyl esters, such as methyl or butyl ester, of one or more of said carboxylic acids, said α-olefin having been oxidized to an Acid Number of 10 to 120 as measured prior to any esterification; (b) a hydrocarbon-soluble ester-containing polymer having at least one branch of 10 to 36 carbon atoms and having a number average molecular weight of 5000 to 300,000; (c) a carboxylic acid having at least 10 carbon atoms; (d) a salt of an alkylarylsulfonic acid, wherein the alkyl group thereof is of sufficient length to provide solubility of the salt in a hydrocarbon oil; (e) a hydrocarbon oil in an amount sufficient to dissolve said salt; and (f) optionally, a volatile diluent.

The disclosed technology further provides a surface coated with the above coating composition; a method of providing rust protection to a surface, comprising applying thereto the coating composition; and a film comprising the above components.

DETAILED DESCRIPTION

Various preferred features and embodiments will be described below by way of non-limiting illustration.

The coating composition of the disclosed technology comprises an oxidized α-olefin. The oxidized α-olefin is prepared from an α-olefin having 16 to 40 carbon atoms or, in other embodiments, 16-36 or 20-24 or 24-28 or 26-28 carbon atoms, or in some instances 30 carbon atoms and greater, e.g., 30-48, 30-36. Alpha olefins having such carbon numbers are commercially available materials which may be prepared, for instance, by stepwise addition of ethylene to certain organometallic compounds (e.g., triethylaluminum) in the presence of a catalyst such as colloidal nickel. The term "α-olefin" refers to an olefin that has a double bond between the first and second carbon atom of the longest contiguous chain of carbon atoms. The α-olefins may be linear or branched. The term does not exclude the presence of one or more additional double bonds at other positions in the carbon chain, nor does it exclude the possible presence of heteroatoms within the carbon chain or pendent from the chain, such as oxygen atoms. Commercial α-olefins are typically mixtures of individual molecules having the number of carbon atoms specified in the above ranges and optionally including relatively small amounts of molecules outside those ranges. In one embodiment, the α-olefin is a mixture of hydrocarbon molecules.

The oxidized α-olefin may be prepared by an oxidation process. Methods for preparing oxidized α-olefins are known and may include reaction of the α-olefin with oxygen or a molecular-oxygen-containing gas at elevated temperatures, optionally under pressure and optionally under catalytic conditions. Commonly used catalysts include manganese-based catalysts such as manganese naphthenate, optionally in the presence of a calcium salt of a carboxylic acid as described in U.S. Pat. No. 2,808,423, Bartlett et al., Oct. 1, 1957. In one embodiment a catalytic amount of an organic calcium salt may be used. Oxidation in the absence of catalyst is described in US 2013/0068134, Yang et al., Mar. 21, 2013.

The oxidation of olefins in a commercial process may proceed by a free-radical process and may involve chain scission, chain coupling, and formation of a variety of oxidized species including esters, ketones, aldehydes, acids, and lactones. As a result, the molecular weight or carbon number of the oxidized α-olefin may differ somewhat from that of the α-olefin prior to the oxidation process. Nevertheless, in certain embodiments and for identification purposes, the carbon number of oxidized α-olefins may be taken to be, as an average of species present, within the ranges recited above for the α-olefin before oxidation, e.g., 16 to 40, carbon atoms or 16-36 or 20-24 or 24-28 or 26-28.

The extent of oxidation of the α-olefin may be characterized by the Acid Number of the oxidized product. Acid Number is defined in ASTM D974 and is expressed as the number of mg of KOH to neutralize the acidic functionality in 1 g of material. The oxidized α-olefins may be oxidized to an Acid Number of 10 to 120, or 10 to 100, or 15 to 20, or 20 to 100, or 30 to 85, or 40 to 80 or 60 to 80. The Acid Number will typically be a measure of the amount of carboxylic acid functionality in the oxidized olefin mixture and is typically determined prior to esterification of the acid functionality.

The oxidized α-olefin may be used as is, that is, containing the carboxylic acid functionality (along with other oxygen-containing functionality that may be present). Alternatively, the oxidized α-olefin may be esterified. Esterification may be by reaction with an alcohol, optionally in the presence of a catalytic amount of an acid such as sulfuric acid. The alcohols may contain 1 to 28 carbon atoms, or 1 to 8, or 1 to 4, or 1, 2, 3, or 4 carbon atoms, or mixtures thereof. The alcohols may be linear or branched, that is, in any of their isomeric forms, e.g., methanol, ethanol, propyl alcohol, isopropyl alcohol, n-butyl alcohol, sec-butyl alcohol, iso-butyl alcohol, t-butyl alcohol, 2-ethylhexanol, 2-butyl octanol, 2-hexyl decanol, 2-octyl dodecaonol, 2-decyl-tetradecanol, 2-dodecyl-hexadecanol, or mixtures thereof. If there is more than one carboxylic acid group on a particular oxidized α-olefin, one or more of the carboxylic groups may be esterified and one or more may remain unesterified; moreover, the esterifying alcohol may be the same or different for each of the multiple carboxylic groups. In one embodiment, the oxidized α-olefin may be esterified with methanol. In one embodiment, the oxidized α-olefin may be esterified with n-butanol or with iso-butanol or a mixture of butanols.

The esterification of the oxidized α-olefin will consume some but not necessarily all of the acidic functionality originally imparted by the oxidation process. The extent of reaction may be evaluated by measuring the acid number before and after the esterification reaction. For example, if an α-olefin is oxidized to an acid number of 60 to 80, after its esterification the acid number may be 10 to 30 or 12 to 28 or 15 to 25 or 17 to 25, or less than 20. In certain embodiments esterification with methanol may lead to an acid number of 17 to 25. In certain embodiments esterification with butanol may lead to an acid number less than 20.

The amount of the oxidized α-olefin in a formulation may be 10 to 45 percent by weight of the composition, or 15 to 40, or 20 to 40, or 25 to 38 percent by weight. These percentages are calculated in the absence of, and exclusive of, the amount of any volatile diluent that may be present. The actual amount in a formulation that includes volatile diluent, will be proportionately reduced depending on the amount of the volatile diluent present, as will be evident to the person of ordinary skill.

As well as an oxidized α-olefin, the disclosed composition may also contain unoxidized α-olefin. The un-oxidized α-olefin may be selected from the α-olefins described above as suitable for preparation of the oxidized α-olefin, and may be the same or different from the olefin or olefins used to prepared the oxidized α-olefin. Thus, for instance, the unoxidized α-olefin may contain 10 to 40 or 16 to 40 carbon atoms, or 16-36 or 20-24 or 24-28 or 26-28 carbon atoms, and may otherwise be as described in greater detail above.

If present, the un-oxidized α-olefin may be present in an amount of up to 40 weight percent of the coating composition, such as 0.2 to 40, or 10 to 40, or 15 to 35 weight percent. This amount is calculated excluding the presence of any optional volatile diluent in the composition. The amount of unoxidized α-olefin may be, for instance, 10 to 40 percent if the coating composition is in the form of a concentrate or may be 0.2 to 20 percent if the coating composition is in the form of an oil-diluted material. The amount of the unoxidized α-olefin may also be expressed as a ratio to the amount of the oxidized α-olefin, and such ratio may be 0.3:1 to 2:1, or 0.5:1 to 2:1, or 1:1.6 to 1:1, or about 1.3:1 by weight. That is, in some embodiments the amount of unoxidized α-olefin may be similar to the amount of oxidized.

It is recognized that when an α-olefin is oxidized some of the individual α-olefin molecules may remain in the unoxidized state. In a practical commercial sense, such molecules would be difficult to distinguish from the oxidized portion and thus may commonly be considered a part of the oxidized α-olefin. For many purposes they will be considered to contribute to the quantity of the oxidized α-olefin.

The composition may also contain one or more hydrocarbon-soluble ester-containing polymers, which may function as solubility agents. A solubility agent is useful to assist in assuring solubility of the various components such as the oxidized α-olefin in the coating composition, both within a concentrate and in a subsequent dilution in oil or solvent. If the components are not fully soluble, they may not be dissolved initially in the formulation or concentrate, or they may precipitate out of solution to a greater or lesser extent upon standing. Such insolubility is unacceptable from an end user's standpoint, as the precipitation can cause fouling of the application equipment and inconsistent product performance. Solubility agents may also be or comprise pour point depressants.

The solubility agent is thus a hydrocarbon-soluble ester-containing polymer. It will have at least one branch or side chain of 10 to 36 carbon atoms and will have an overall number average molecular weight of 5000 to 300,000. In one embodiment the ester functionality of the polymer will be pendant from the main polymer chain and the branches or side chains will be associated with the pendant ester functionality. This would be in distinction from polymers in which the ester functionality is within the main polymer chain, such as, for instance, polyethylene terephthalate.

The ester-containing polymer may comprise a copolymer of an alkyl ester with vinyl acetate or with a vinyl aromatic compound, wherein the alkyl group contains 12 to 22 carbon atoms. More particularly, in certain embodiments the ester-containing polymer may comprises units of polymerized ester of maleic acid or fumaric acid.

In certain embodiments, the ester-containing polymer may be a polymer comprising at least one monomer of a least one alkyl ester of an ethylenically unsaturated 1,2-diacid, wherein the alkyl groups of the ester contain on average 10 to 36 carbon atoms. This material is a polymer which has a substantially carbon chain backbone derivable from the addition polymerization of an ethylenically unsaturated diacid, optionally with other comonomers, described below. The polymerized acid groups are at least partly, and may be substantially completely, in the form of alkyl esters. Reference herein to polymerization of acids is not intended to be limiting to the use of the actual acid in the polymerization reaction, but encompasses polymerization of esters and other materials which can be converted into esters, including anhydrides and acid halides.

Diacids which are capable of polymerization may encompass those ethylenically unsaturated acids having 3 to 6 carbon atoms, including those with $\alpha,\beta$-ethylenic unsaturation. Specific materials include fumaric acid, maleic acid, itaconic acid, and citraconic acid and their reactive equivalents. Among these diacids, fumaric acid may be used; the corresponding dialkyl ester is a dialkyl fumarate. It is understood that maleic acid and fumaric acid become substantially equivalent after they are polymerized, since their double bond becomes a single bond during the polymerization reaction, although details of the stereochemistry of the resulting polymer may differ. References herein to polymers of fumaric acid or fumaric esters are intended to include polymers similarly derived from maleic acid, maleic anhydride, or maleic esters.

The polymers useful in the present technology may be prepared directly from an ester of the acid, from the acid itself, or (in the case of certain diacids) the anhydride, or from other reactive monomers. If the polymer is prepared from one of the materials other than the ester it can be converted into the ester form by reaction of the polymer with a suitable alcohol or by other well-known reactions.

The alcohol with which the acid monomer or the polymeric acid functionality or equivalent thereof is reacted to form the ester is an alcohol with an alkyl chain containing 10 to 36 carbon atoms, such as 10 to 28 or 12 to 22 carbon atoms. This assures that there is at least one alkyl branch in the solubility agent of 10 to 36 carbon atoms. The alkyl group need not be derived from a single alcohol of a single chain length, however, but can be derived from a mixture of alcohols if desired, provided that at least on average the chain lengths of the alcohol portion fall within the desired range.

The ester-containing polymer may also contain other monomers derived from ethylenically unsaturated compounds. These comonomers can be short chain ester-containing monomers. Examples of short chain ester-containing monomers include vinyl alkanoates where the alkanoate moiety contains up to 8 carbon atoms and preferably up to 4 carbon atoms, such as vinyl acetate, vinyl propionate, and vinyl butyrate. Other examples are short chain esters of unsaturated acids, having fewer than 8 or 10 carbon atoms, such as up to 4 carbon atoms in the alcohol-derived moiety. Such short chain esters include methyl acrylate, methyl methacrylate, ethyl acrylate, ethyl methacrylate, propyl acrylate or methacrylate, and n-butyl, t-butyl, and isobutyl acrylate or methacrylate. In one embodiment, the hydrocarbon-soluble ester-containing polymer may comprise a poly (meth)acrylate (that is, a polyacrylate or a polymethacrylate). Alternatively, or additionally, the polymer can contain short chain alkyl ether comonomers, where the alkyl group has up to 8 carbon atoms and preferably up to 4 carbon atoms. Examples are vinyl ether groups such as the alkyl vinyl ethers, e.g., ethyl vinyl ether, propyl vinyl ether, and the butyl vinyl ethers.

Other possible monomers include nitrogen-containing monomers in which a nitrogen atom may be, for instance, in the form of an amine in a group pendant from the polymer chain. In some embodiments the pendant group may be linked to the chain through an ester, amide, or imide linkage. For instance, a monomer unit containing the components of polymerized maleic anhydride and N,N-dimethylaminopropylamine may be in the form of an amide or imide, providing a pendant N,N-dimethylaminopropyl group. Another nitrogen-containing monomer may be an amide or imide formed from N-aminopropyl-morpholine. Another nitrogen-containing monomer may be an ester formed from N,N-dimethylamino-1-propanol by condensation with maleic anhydride or acrylic or methacrylic acid. The amount of the optional nitrogen-containing monomer may be 0 to 10 weight percent, or 0.5 to 5, or 1 to 4 weight percent of the polymer.

Another suitable comonomer is vinyl acetate, and the copolymer is, in one embodiment, a copolymer with an alkyl fumarate, such as a dialkyl fumarate, with vinyl acetate. The mole ratio of alkyl fumarate to vinyl acetate may, in certain embodiments, range from 1:2 upwards to 100 mole percent alkyl fumarate (that is, a homopolymer); in some instances the mole ratios may be 1:2 to 2:1, or 0.9:1 to 1:0.9.

The ester-containing polymer may also contain other copolymerizable monomers such as $\alpha$-olefins, including ethylene or propylene, or vinyl aromatic monomers such as styrene, as well as, optionally, carbon monoxide or sulfur dioxide. In certain embodiments the hydrocarbon-soluble ester-containing polymer may comprise an alpha-olefin-maleic anhydride ester copolymer, a styrene-maleic anhydride ester copolymer, a fumaric acid-vinyl acetate ester copolymer, or mixtures thereof. The ester may be characterized by pendant chains (e.g., the alcohol-derived portion of the ester) that are a mixture of alkyl groups, such as linear C24-28 alkyl groups and branched C16 alkyl groups, or alternatively branched C8-12 groups and linear C14-18 groups, or substantially linear C24-26 groups, or C8-12 groups and C14-24 groups along with 1-19 weight percent methyl groups. In one embodiment any such mixtures of alcohols may be used to form the ester of a maleic anhydride-styrene copolymer, an $\alpha$-olefin-maleic anhydride copolymer, or a methacrylate or acrylate copolymer.

The amount of supplemental comonomers, if any, may be sufficiently low that the polymer substantially retains its character as a hydrocarbyl alkenoate polymer, modified by the presence of the above-defined comonomers.

The ester-containing polymers of can be prepared by known methods. In one case di-(C12-C14) fumarate is mixed with an appropriate amount of vinyl acetate or styrene, and the reactants mixed and heated, with or without a solvent or diluent, in the presence of a small amount of an initiator at 25° C. to 150° C., or up to 100° C. Since the polymerization is exothermic, cooling may be required to maintain the reaction mixture at the desired temperature. It may be convenient to add one of the reactants to the other reactant or reactants over a period of time in order to control the rate of the reaction. The polymerization may be carried out in the presence of a small amount of an initiator such as an organic peroxide such as benzoyl peroxide, or azo-bis-isobutyronitrile. Often 0.01 to 1.5% of the initiator may be used. The reaction time may vary from 1 to 30 hours depending on the temperature, reactivity of the monomers, and other reaction conditions. The polymerization can be run continuously or batchwise. Details of such polymerizations are well known to those skilled in the art and are reported in greater detail in U.S. Pat. No. 3,250,715. The polymers are also described in U.S. Pat. No. 6,017,370.

The molecular weight of the resulting polymer will depend on a variety of factors under the control of the skilled operator, including concentrations of monomers and catalyst. The polymer as used in the disclosed technology may have a number average molecular weight of 5,000 to 400,000, or 6,000 to 100,000, or 8,000 to 50,000, or 10,000 to 45,000.

Specific examples of suitable ester-containing monomers include those shown in the following Table:

| polymer type | pendant chain length, C atoms | pendant chain type | $M_n$ |
|---|---|---|---|
| α-olefin/maleic anhydride | 8-10 | linear | 15,300 |
| | 8-10 | linear & branched | 28,900 |
| | 8 | branched | 27,000 |
| | 12-18 | linear | 16,600 |
| | 12-18 | linear & branched | 17,300 |
| | 12 | branched | 26,300, 25,800 |
| | 24-28 | linear | 16,600 |
| | 16 & 24-28 | branched & linear | 20,600 |
| | 16 | branched | 17,100 |
| | 12-14 | (unspecified) | 28,000 |
| | 22 | (unspecified) | 85,300 |
| styrene/maleic anhydride | 8-10 | linear | 44,700 |
| | 8-10 | linear & branched | 53,400 |
| | 8 | branched | 40,000 |
| | 12-18 | linear | 43,700 |
| | 12-18 | branched & linear | 43,000 |
| | 12 | branched | 39,300 |
| | 24-28 | linear | 35,100 |
| | 16 & 24-28 | branched & linear | 55,400 |
| | 16 | branched | 57,000 |
| | 16-18 | (unspecified) | 33,400 |
| | 18-22 | (unspecified) | 274,000, 44,200 |
| | 20-24 | (unspecified) | 47,700 |
| | 14-15 | (unspecified) incl. small amount N-aminopropylmorpholine | 41,200 |
| | 16-18 & 24-28 (varying ratios) | (unspecified) | 34,400, 59,200 |
| | 8-18 | (unspecified) | 39,400, 40,200, 50,500, 29,700 |
| | 6-16 | (unspecified) | 41,700 |
| | 8-16 (varying ratios) | (unspecified) | 40,200, 38,600 |
| | 8-14 | (unspecified) | 39,100 |
| | 14-15 | (unspecified) | 176,000, 33,000 |
| | 4 & 8-20 | (unspecified) | 153,000 |
| polymethacrylate | 12 & 18 (varying ratios) | linear | 32,100-87,400 |
| vinyl acetate/ fumaric acid | 12-22 | (unspecified or linear) | 71,100 |
| | 18-22 | (unspecified or linear) | 256,000 |
| | 20+ | (unspecified or linear) | 138,000 |

The hydrocarbyl-soluble ester-containing polymer (solubility agent) may be present in an amount of 0.1 to 10 percent by weight, or 0.5 to 5 or 0.7 to 2 percent by weight, excluding, as before, the presence of any volatile diluent.

The relative weight ratio of oxidized α-olefin component to the hydrocarbyl-soluble ester-containing polymer may be 400:1 to 4:1 or 200:1 to 10:1 or 100:1 to 20:1 or 50:1 to 30:1.

The coating compositions of the disclosed technology also includes a carboxylic acid having at least 10 carbon atoms. The acid may be a monoacid or it may be a diacid or polyacid. By "polyacid" is meant a material having three or more carboxylic acid groups. However, if the diacid or polyacid is a diacid having two carboxylic acid groups on adjacent carbon atoms, then the diacid should have at least 14 total carbon atoms. In one embodiment, the diacid or polyacid is a diacid having at least 16 carbon atoms, the two carboxylic acid groups being separated by at least 6 carbon atoms. In such an embodiment, there may also be more than two carboxylic acid groups present, but if so, then at least two of them may be separated by at least 6 carbon atoms which are not themselves substituted by a carboxylic group. The separating carbon atoms in such an embodiment are typically non-aromatic and, in one embodiment, they comprise a carbon chain, that is, without interruption by inserted oxygen or nitrogen atoms. In certain embodiments the carboxylic groups may be separated by 8 to 24 carbon atoms, or 10 to 20, or 12 to 20, or 14 to 18 carbon atoms.

One type of diacid is known as dimer acids or dimerized acids. Dimer acids are products typically prepared by dimerization of long chain, e.g., C18, unsaturated fatty acids. They are often prepared by self-condensation of oleic acid or tall oil fatty acids. Dimer acids are mixtures of relatively high molecular weight materials, m.w. around 560, yet are liquid at room temperature. They are commercially available materials that may be prepared by either a Diels-Alder reaction or by a free radical route, or by catalysis on a substrate such as clay. Among many possible structures for dimer acids, one representative is shown below:

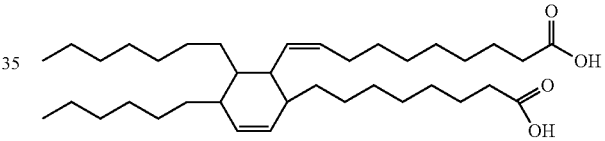

Dimer acids and their preparation are extensively discussed in the *Kirk-Othmer Encyclopedia of Chemical Technology*, Third Edition, volume 7, pages 768-782, John Wiley & Sons, New York (1979).

In another embodiment, a diacid may include a hydrocarbyl-substituted succinic acid having at least 14 carbon atoms including the four carbon atoms of the succinic acid moiety, e.g., succinic acid substituted with a 10-carbon alkyl. In other embodiments there will be at least 12, 14, 16, or 18 carbon atoms in such an alkyl substituent (for a total number of 16, 18, 20, or 22 carbon atoms). The number of atoms in the akyl substituent may be up to 36 or 30 or 24 or 22 carbon atoms.

In another embodiment, the diacid may be an α,ω-alkylene diacid, of at least 10 or 12 carbon atoms, and up to, for instance, 36 or 24 or 18 carbon atoms. Examples include 1,10-decanedioic acid, 1,12-dodecanedioic acid, and 1,18-octadecanedioic acid.

Alternatively, the acid may be a monocarboxylic acid, having at least 10 carbon atoms. In some embodiments it may have a carbon chain of 8 to 24 carbon atoms. Such acids are often derived by hydrolysis of natural oils or fats. They may be saturated or unsaturated and may contain additional substituents such as a hydroxy group. These acids, sometimes referred to as fatty acids, are well known and may typically include stearic acid or hydroxystearic acid.

The amount of the above-described carboxylic acid, whether monoacid, diacid, or polyacid in the coating composition of the disclosed technology, may be 0.3 to 10 percent by weight, or 0.5 to 8, or 1 to 5 percent by weight, calculated excluding the presence of any volatile diluent.

The formulation will typically also contain a salt of an alkylarylsulfonate having one or more hydrocarbyl or alkyl groups of sufficient length to provide solubility in a hydrocarbon oil. The salt may be a metal salt or, alternatively, a non-metal salt such as an amine (or ammonium) salt. The "sufficient length" may be at least 12 carbon atoms and up to 200 carbon atoms, such as 18 to 100 or 24 to 48 carbon atoms in the combined alkyl or hydrocarbyl groups or, alternatively, in the longest of such groups if there is more than one. In one embodiment, each hydrocarbyl or alkyl group may individually contain at least 8 or at least 12 carbon atoms, and up to 200 carbon atoms, or 18 to 100 or 24 to 48. Examples of metal sulfonate salts include relatively low molecular weight salts such as calcium mono-, di-, or tri-nonyl naphthalene sulfonate (or mixtures of mono-, di-, and tri-alkyl species) and relatively higher molecular weight salts such as calcium oligo- or poly-propene benzenesulfonates or -toluenesulfonates. These may be neutral salts or overbased salts. Neutral salts are those that contain approximately or exactly a stoichiometric amount of metal ion to neutralize the acid functionality of the alkarylsulfonic acid. Overbased salts are prepared by reaction with a stoichiometric excess of metal, such as calcium, barium, magnesium, potassium, zinc, or sodium, in the form of a basic compound such as, in the case of calcium, the oxide, hydroxide or, ultimately, the carbonate as a result of treatment with carbon dioxide. Overbased materials are well known in the lubricant industry as overbased detergents and may also function as surfactants or wetting agents. In certain embodiments, the salt may be a calcium, barium, or sodium salt. The salt may be a calcium salt. It may be a salt of an alkarylsulfonic acid that contains an alkyl group of 9 to 200, or 12 to 200, or 18 to100, or 25 to 50, or 30 to 40 carbon atoms. the amount of (a) the oxidized α-olefin is about 0.3 to about 22 percent by weight, the amount of (b) the hydrocarbon-soluble ester-containing polymer is about 0.002 to about 8 percent by weight, the amount of (c) the carboxylic acid is about 0.02 to about 10 percent by weight, the amount of (d) the salt of the alkarylsulfonic acid is about 0.06 to about 20 percent by weight, and the amount of (e) the hydrocarbon oil is about 70 to about 98 percent by weight, It may be a calcium salt of such an alkarylsulfonic acid. Such materials are typically provided in commercial form in the presence of an amount of a diluent oil, typically a mineral oil such as an API Group I oil, in which they are often prepared. The amount of diluent oil that may be associated with and accompany the metal alkylarylsulfonate salt may be in the ratio of 1:5, to 5:1 of the salt, to oil. Overbased detergents are described in detail in U.S. Pat. Nos. 2,501,731; 2,616,905; 2,616,911; 2,616,925; 2,777,874; 3,256,186; 3,384,585; 3,365,396; 3,320,162; 3,318,809; 3,488,284; and 3,629,109.

The amount of the salt (e.g., metal salt) of the alkylarylsulfonate in the disclosed coating composition 2 to 30 percent by weight, or 3 to 30, or 3 to 25, or 4 to 20, or 5 to 15 percent by weight, on an oil-free basis. The quoted amounts, as above, exclude the amount of any volatile diluent that may be present.

The coating composition will also contain an oil in an amount sufficient to dissolve the metal salt of the alkylarylsulfonic acid. The oil may be a natural or synthetic oil, an oil derived from hydrocracking, hydrogenation, and hydrofinishing, an unrefined, refined, re-refined oil, or mixtures thereof. A more detailed description of unrefined, refined and re-refined oils is provided in International Publication WO2008/147704, paragraphs [0054] to [0056] and in the corresponding paragraphs of US-2010-0197536. A more detailed description of natural and synthetic lubricating oils is described in paragraphs [0058] to [0059] respectively of WO2008/147704. Synthetic oils may also be produced by Fischer-Tropsch reactions and typically may be hydroisomerized Fischer-Tropsch hydrocarbons or waxes. In one embodiment oils may be prepared by a Fischer-Tropsch gas-to-liquid synthetic procedure as well as other gas-to-liquid oils. In one embodiment, the oil may be selected from any of the base oils in Groups I-V as specified in the American Petroleum Institute (API) Base Oil Interchangeability Guidelines. The five base oil groups are as follows: Group I: >0.03% sulfur and/or <90% saturates and viscosity index (VI) 80 to 120; Group II: ≤0.03% sulfur and ≥90% saturates and VI 80 to 120; Group III: ≤0.03% sulfur and ≥90% saturates and VI>120; Group IV: all polyalphaolefins; Group V: all others. Groups I, II and III are mineral oil base stocks. Natural oils also include vegetable oils such as coconut oil, castor oil, olive oil, peanut oil, rapeseed (canola) oil, corn oil, sesame seed oil, cottonseed oil, soybean oil, palm oil, sunflower oil, safflower oil, linseed oil, and tung oil. In one embodiment the oil is a hydrocarbon oil. In other embodiments the oil may be a mineral oil, or it may be other than a mineral oil, e.g., a poly-α-olefin oil or a vegetable oil.

The amount of oil, such as hydrocarbon oil, in the coating composition may be 2 to 80 percent by weight, 5 to 70 or 10 to 45 or 15 to 35 percent by weight, or 2 to 30 percent by weight. In another embodiment the oil, such as hydrocarbon oil, may be 70 to 98 percent of the composition. In one embodiment, the amount of (a) the oxidized α-olefin is 0.3 to 22 percent by weight, the amount of (b) the hydrocarbon-soluble ester-containing polymer is 0.002 to 8 percent by weight, the amount of (c) the carboxylic acid is 0.02 to 10 percent by weight, the amount of (d) the salt of the alkarylsulfonic acid is 0.06 to 20 percent by weight, and the amount of (e) the hydrocarbon oil is 70 to 98 percent by weight, These amounts are calculated exclusive of any optional volatile diluent that may be present.

The coating composition may also optionally contain a volatile diluent. By "volatile diluent" is meant a normally liquid component that has a volatility greater than that of an oil such as mineral oil. The volatile diluent may comprise water or one or more organic solvents. The diluent may thus comprise a volatile organic solvent such as naphtha (also known as petroleum ether), mineral spirits, kerosene, or ethyl lactate. Among these materials may be hydrocarbon solvents. Such materials may have a boiling point of 30 to 60° C. or higher temperatures, up to a range of 175 to 280° C. Some such volatile diluents may have a boiling range of 130-210° C.; others 196-205° C. Overall, a diluent may be considered volatile if its boiling point is less than 280° C.

The volatile diluent may be present in a concentrate of the foregoing components, if desired, although most commonly the diluent, or the majority of the diluent will be added in preparing the fully formulated, diluted coating composition. The amount of diluent will typically be an amount to provide for appropriate viscosity and rheological performance so that the coating composition may be applied to a substrate such as a metallic article or surface. Thus, if the concentrate is diluted to 20 percent in the final coating composition, the total amount of diluent will typically 80 percent additional solvent or diluent to make the dilution (in addition to the oil dissolving the metal salt, which is not counted toward the amount of the volatile diluent). The overall total amount of the diluent (if present) will depend, of course, on the amount of dilution used to prepare the final coating composition and so may be 40 to 98 percent by weight, or 60 to 98, or 40 to 95, or 60 to 88, or 80 to 86, or 82 to 84 percent by weight. The amount of the other components will typically be 100% by weight less the amount of the optional volatile diluent, such as 2 to 60 weight percent and other amounts that may be readily determined by the skilled person That is, one of the ways in which the present technology may be employed is by preparing an initial mixture of the components described herein, without the presence of the optional volatile diluent, or with its presence only in small amounts such as up to 10 percent or 5 percent or 2 percent or 1 percent or 0.1 percent by weight of the composition. For this reason, the amounts of the other components may be expressed as a percentage of the composition exclusive of the amount of the optional volatile diluent. It is in this form (volatile diluent- or solvent-free) that the materials of the disclosed technology may often be commercially prepared and distributed. However, the diluent-free material may have a viscosity that is unsuitable for easy handling, so addition of a volatile diluent may be desirable before the composition is applied as a coating to a substrate. If, at the time of application of the coating, a diluent is present, then the actual amounts of the other components can be calculated to take into account the presence of the diluent. Thus, if the oxidized α-olefin is present at 30 weight percent in the initial formulation (without diluent or factoring out the presence of any diluent), and if the composition, at the time it is applied as a coating, contains 80 percent by weight of volatile diluent, then, at the time of application as a coating, the actual concentration of the oxidized α-olefin in the coating composition as applied will be 6 weight percent. Since the volatile diluent will typically thereafter be removed, e.g., by evaporation, then the concentration of the various components after such removal may be the same as reported before the addition of the volatile diluent. Of course, with the passage of time some further "drying" or curing of the coating composition may occur, so the amounts or even identities of the components may alter in a manner that will be apparent to the skilled person.

An optional material in the disclosed formulations is a hydrocarbon wax, other than the oxidized α-olefin described above. Examples of hydrocarbon waxes include paraffin wax, including synthetic paraffin wax derived from Fischer-Tropsch processes, and microcrystalline wax. The hydrocarbon wax may be a low-melt petroleum wax, such as a paraffin wax having a melting point of 32-36° C. The hydrocarbon wax may comprise molecules containing 18 to 75, or 20 to 36 carbon atoms. The amount of hydrocarbon wax, if present, will be at a lower amount than would be required in the absence of the oxidized α-olefin. Thus it may be present, for instance, (if at all) at 0.1 to 30, or 0.2 to 20, or 1 to 28, or 5 to 25, or 10 to 20 percent by weight in a coating composition, such as 0.2 to 10 percent in an oil diluted composition or 10 to 20 percent in a concentrate. The amount is calculated excluding the optional presence of volatile diluent.

Related to hydrocarbon wax and to the oxidized α-olefin (but considered separately for the present discussion) is the optional presence of an oxidized hydrocarbon wax, such as an oxidized petroleum wax, other than an oxidized α-olefin. Any of the above-mentioned hydrocarbon waxes may be present as oxidized waxes. In one embodiment, the oxidized wax may be an oxidized paraffin wax. A paraffin wax may be partially or selectively oxidized by known methods, for instance, by treatment with transition metal catalyst. The oxidized wax will typically contain carboxylic acid functionality, which may be converted to the ester form by reaction with an alcohol such as methanol, ethanol, propanol, butanol, or other linear alcohols. The choice of alcohol can also optionally include branching or ring structures. The amount of oxidized hydrocarbon wax, if present, may be at 1 to 25 percent by weight, or 2 to 20, or 5 to 15 percent, in a coating composition; the amount being calculated excluding the optional presence of volatile diluent.

Another optional component is a triglyceride based on one or more fatty acids of 8 to 24 carbon atoms, or mixtures thereof. Triglycerides are well known to be esters of fatty acids with glycerol and are prominent components of, or are or derived from animal fats or oils or vegetable fats or oils. By the term "fatty acid" is meant one or a mixture of aliphatic carboxylic acids containing from 8 to 24 carbon atoms, and often 12 to 20 or 14 to 18 or 16 to 18 carbon atoms. If desired, this optional component may comprise a first triglyceride having a melting point of 35° C. to about 65° C. and a second triglyceride having a melting point of less than 35° C. It is known that hydrogenation (full or partial) of triglyceride oils leads to increased saturation and increased melting points; thus, triglyceride oils may be converted to waxes of a desired melting point, depending in part on how severely the hydrogenation is conducted. Such hydrogenated materials are commercially available from a variety of sources. The amount of the optional triglyceride, if present, may be, for instance, 0.1 to 30, or 1 to 28, or 5 to 25, or 10 to 20 percent by weight in a coating composition, such as 0.2 to 10 percent for an oil-diluted composition or 10 to 20 percent for a concentrate. The amount is calculated excluding the optional presence of volatile diluent.

The coating composition may also, optionally, contain one or more additional components or additives that are conventionally used in coating metals, in conventional amounts. Such optional additives may include antioxidants, polymeric film formers such as acrylic polymers, surfactants (including wetting agents), colorants, defoamers, demulsifiers, and rheology modifiers.

Other materials may also be present that may affect solubility, adhesion, or corrosion protection. For instance, corrosion inhibitors may include thiadiazoles, triazoles, imidazolines, borate esters, phosphorus esters, amines, and carboxylic acids. The amount of a corrosion inhibitor, if present, may be at 0.1 to 30 percent by weight or 0.25 to 20 or 0.5 to 10 percent in a concentrate, or, in a fully diluted coating composition, 0.005 to 20 percent, or 0.01 to 15 percent, or 0.02 to 12 percent, or 0.02 to 7 percent or 0.1 to 5 percent.

Another material that may optionally be present is a phenol-formaldehyde condensate, sometimes referred to as a Novolac resin. The phenol component may be a hydrocarbyl substituted phenol and, in one embodiment, may be a C10-C36, or C22-C24, or C12-C20 alkyl-substituted phenol. Often the formaldehyde to phenol molar ratio may be approximately equal to one or may be less than one, to avoid formation of very high molecular weight material. These condensates may be prepared by reaction of the components, with heating, in the presence of a catalytic amount of acid such as sulfuric acid. The amount of the phenol-formaldehyde condensate, if present, may be 0.1 to 10 percent by weight or 1 to 7 percent, or 2 to 6 percent by weight in a concentrate, or in a fully diluted coating composition, 0.005 to 7 percent, or 0.01 to 5 percent, or 0.02 to 4 percent, or 0.02 to 2.5, or 0.1 to 2 percent by weight.

The coating compositions of the disclosed technology may be prepared by mixing the desired components together with stirring and, if desired, with heating. There is no particular required order of mixing, and the details of the mixing of any particular composition will be apparent to the skilled person. It may be desirable, for instance, to avoid processing or mixing conditions that would lead to saponification of any ester-containing1 materials, such as high temperatures or the presence of strong acid or base.

The described compositions find particular advantageous use as coatings on surfaces, and thus the disclosed technology encompasses a surface coated with the above-described coating composition in any of its variations or embodiments. The coating composition may be especially useful for coating metal surfaces such as ferrous metal surfaces that are subject to rust, such as steel and cast iron, although many non-ferrous metal surfaces can derive protection and thereby benefit from the described compositions as well. Some surfaces that may benefit from the coating described herein include aluminum surfaces, galvanized iron phosphate surfaces, and zinc phosphate surfaces. In some embodiments, the coatings may be useful to provide protection to an article for a period of weeks or months, for instance, during shipping, storage, or manufacture, rather than for years as might be typical of a paint or other permanent coating. In other embodiments, however, the coating may be left on the surface indefinitely (e.g., even for a period of years).

The disclosed technology also provides a method for providing protection, such as rust protection or, more generally, corrosion protection, to a surface, comprising applying thereto the above-described coating composition. The coating composition of the disclosed technology may be applied to an article or surface by brushing, rolling, dipping, curtain coating, doctor blading, wiping, or spraying. Spraying may be effected using an airless spray/pump device, conventional air spray, or an electrostatic method. The applied coating may have any thickness desired, such as 2 μm to 200 μm or 5 to 150 μm, or 10 to 100 μm.

If the coating composition, as applied, contains a volatile diluent or solvent, that diluent will typically be removed as a part of the coating process, prior to shipment, storage, or use of the coated material. Drying or evaporation may be conducted with heat and ventilation, with ventilation or air flow, or by other known means. The thickness of the coating, after diluent removal, will typically differ from the thickness of the coating as applied (including volatile diluent or solvent), so correction therefor may be made, as will be recognized by the person skilled in the art.

The amount of each chemical component described is presented exclusive of any solvent or diluent oil (except for the amount of the diluent oil itself), which may be customarily present in the commercial material, that is, on an active chemical basis, unless otherwise indicated. However, unless otherwise indicated, each chemical or composition referred to herein should be interpreted as being a commercial grade material which may contain the isomers, by-products, derivatives, and other such materials which are normally understood to be present in the commercial grade.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include: hydrocarbon substituents, including aliphatic, alicyclic, and aromatic substituents; substituted hydrocarbon substituents, that is, substituents containing non-hydrocarbon groups which, in the context of this invention, do not alter the predominantly hydrocarbon nature of the substituent; and hetero substituents, that is, substituents which similarly have a predominantly hydrocarbon character but contain other than carbon in a ring or chain. A more detailed definition of the term "hydrocarbyl substituent" or "hydrocarbyl group" is found in paragraphs [0137] to [0141] of published application US 2010-0197536.

It is known that some of the materials described above may interact in the final formulation, so that the components of the final formulation may be different from those that are initially added. For instance, metal ions of one compound may migrate to acidic or anionic sites of other molecules. The products formed thereby, including the products formed upon employing the composition of the present invention in its intended use, may not be susceptible of easy description. Nevertheless, all such modifications and reaction products are included within the scope of the present invention; the present invention encompasses the composition prepared by admixing the components described above.

The invention herein is useful for imparting rust and corrosion preventive properties and performance to metal surfaces, such as anti-rust performance for ferrous metal surfaces, as may be better understood with reference to the following examples.

EXAMPLES

The following components are used to prepare the coating compositions set forth below:

AO1—an alpha olefin having predominantly C26-C28 species

AO2—an alpha olefin having predominantly C20-C24 species

Oxidized AO—the same or similar alpha olefin as AO1, oxidized to an Acid Number of 25-35

Oxidized AO methyl ester—the Oxidized AO, esterified with methanol to an acid number (after esterification) of 17-25

Oxidized AO butyl ester—the Oxidized AO, esterified with n-butanol to an acid number (after esterification) of 10-20

Ba sulfonates—overbased alkaryl barium sulfonates, including 42-49% diluent oil (amount reported on an oil-free basis)

Ca sulfonate 1—a neutral calcium alkylnaphthalenesulfonate, including 40% diluent oil (amount reported on an oil-free basis)

Ca sulfonate 2—a neutral calcium alkylbenzenesulfonate, including 57% diluent oil (amount reported on an oil-free basis)

Ca sulfonate 3—a neutral calcium alkylbenzenesulfonate, including 56% diluent oil (amount reported on an oil-free basis)

Ca sulfonate 4—a neutral calcium alkylbenzenesulfonate, including 50% diluent oil (amount reported on an oil-free basis)

Oleic acid—commercial grade

Ester copolymer 1—a commercially available hydrocarbon-soluble polymeric pour point depressant containing ester functionality and side chains of about 21 carbons, $M_w$ about 43,000. The recited amount is believed to include about 10-60% diluent oil.

Ester copolymer 2—a hydrocarbon-soluble copolymer containing aromatic monomers and ester monomers, the esters prepared from alcohols having 10 to 36 carbons; $M_n$ about 10,000 to 40,000. The recited amount includes about 30% diluent oil.

Diluent—petroleum naphtha

Petroleum Wax, butyl ester—from oxidized petroleum wax Blends 1 through 8 and Reference Blend A. The blends are prepared as shown in Table I below, where the amounts are given in weight percent. Reference Blends A and B are commercial materials, detailed compositions of which are not necessarily fully specified.

TABLE I

| Blend | 1 | 2 | 3 | 4 | 5 | A (ref.) | 6 | 7 | 8 | B (ref.) |
|---|---|---|---|---|---|---|---|---|---|---|
| oxidized AO | | | | | | | 22.3 | 22.3 | 22.3 | |
| oxidized AO methyl ester | 37.3 | | | | | | | | | |
| oxidized AO butyl ester | | 37.3 | 37.3 | 37.3 | 37.3 | | | | | |
| petroleum wax, butyl ester | | | | | | 37.3 | | | | |
| oxidized petroleum wax | | | | | | | | | | 23.8 |
| AO1 | 14.7 | 14.7 | 14.7 | 14.7 | 14.7 | | | | | |
| AO2 | | | | | | | 30.1 | 30.1 | 30.1 | |
| petroleum wax | | | | | | 14.7 | | | | 31.4 |
| Ba sulfonates | 25.2 | 25.2 | | | | 25.2 | | | | |
| Ca sulfonate 1 | | | 27.6 | | | | | | 8.6 | 25.5 * |
| Ca sulfonate 2 | | | | 19.8 | | | | 12.3 | 6.1 | |
| Ca sulfonate 3 | | | | | 20.2 | | | | | |
| Ca sulfonate 4 | | | | | | | 14.3 | | | |
| oleic acid | 1 | 1 | 1 | 1 | 1 | 1 | | | | |
| dimer acid (>10 C) | | | | | | | 4.1 | 4.1 | 4.1 | 4.3 |
| Ester copolymer 1 | 1 | 1 | 1 | 1 | 1 | 1 | | | | |
| Ester copolymer 2 | | | | | | | 3.5 | 3.5 | 3.5 | |
| mineral oil (diluent oil) | 20.8 | 20.8 | 18.4 | 26.2 | 25.8 | 20.8 | 25.7 | 27.7 | 25.3 | 17 |
| Total of above components, % (or as noted below) | 20 | 20 | 20 | 20 | 20 | 20 | 20 | 20 | 20 | 20 |
| Diluent, % (or as noted below) | 80 | 80 | 80 | 80 | 80 | 80 | 80 | 80 | 80 | 80 |

* specific identify of the Ca sulfonate not specified.

The coating compositions so prepared are subjected to the Salt Spray test as described in ASTM B 117. The test formulation is applied to multiple types of steel. The typical thickness of the dipped coatings is 1-4 μm. Hours to failure is the time at which at least 5% of the treated surface shows rust as described in ASTM D610. Two numbers are given for each sample, the first being the last hour of passing and the second being the first hour of failure. Multiple entries represent multiple runs. Results are shown in Tables II and III:

TABLE II

| Test, results (hours) | Blend 1 | Blend 2 | Blend 3 | Blend 4 | Blend 5 | Blend A (ref.) |
|---|---|---|---|---|---|---|
| Salt spray (20% in petroleum naphtha) | | | | | | |
| Panel 1 | 312-328 | 504-520 | 189-232 | 424-428 | 424-432 | 112-120 |
| Panel 2 | 632-648 | 608-624 | 232-240 | 632-648 | 512-576 | 189-232 |
| Salt spray ladder in (D40) | | | | | | |
| 20% | | | | 424-428 | | 80-144 |
| | | | | 632-648 | | 72-80 |
| 15% | | | | 248-312 | | 72-80 |
| | | | | 248-312 | | 56-72 |
| 10% | | | | 56-72 | | 80-144 |
| | | | | 80-144 | | 32-48 |
| 5% | | | | 0-8, | | 0-8, |
| | | | | 0-8 | | 0-8 |
| Salt spray ladder in mineral oil 1 | | | | | | |
| 20% | | | | 8-24, | | 8-24, |
| | | | | 8-24 | | 8-24 |
| 15% | | | | 56-120 | | 8-24, |
| | | | | 56-120 | | 8-24 |
| 10% | | | | 48-56 | | 0-8, |
| | | | | 48-56 | | 0-8 |
| 5% | | | | 8-24, | | 0-8, |
| | | | | 8-24 | | 0-8 |
| Salt spray ladder in mineral oil 2 | | | | | | |
| 20% | | | | 24-32 | | 32-48 |
| | | | | 32-48 | | 24-32 |
| 15% | | | | 8-24, | | 8-24, |
| | | | | 8-24 | | 8-24 |
| 10% | | | | 8-24, | | 8-24, |
| | | | | 8-24 | | 8-24 |
| 5% | | | | 8-24, | | 0-8, |
| | | | | 8-24 | | 8-24 |

TABLE III

| Test, results (hours) | Blend 6 | Blend 7 | Blend 8 | Blend B (ref.) |
|---|---|---|---|---|
| Salt spray (20% in petroleum naphtha) | | | | |
| Panel 1 | 315-331 | 315-331 | 315-331 | 52-73 |
| Panel 2 | 243-307 | 243-307 | 77-141 | 52-73 |
| Salt spray (20% in mineral oil 1) | | | | |
| Panel 1 | 27-43 | 27-43 | 19-27 | 20-28 |
| Panel 2 | 77-144 | 77-141 | 19-27 | 20-28 |
| Salt spray (20% in mineral oil 2) | | | | |
| Panel 1 | 51-76 | 77-141 | 27-43 | 44-52 |
| Panel 2 | 67-75 | 77-141 | 27-43 | 52-73 |

The result show that the coating compositions of the disclosed technology exhibit superior anti-rust performance compared with commercial reference materials.

Each of the documents referred to above is incorporated herein by reference, including any prior applications, whether or not specifically listed above, from which priority is claimed. The mention of any document is not an admission that such document qualifies as prior art or constitutes the general knowledge of the skilled person in any jurisdiction. Except in the Examples, or where otherwise explicitly indicated, all numerical quantities in this description specifying amounts of materials, reaction conditions, molecular weights, number of carbon atoms, and the like, are to be understood as optionally modified by the word "about." It is to be understood that the upper and lower amount, range, and ratio limits set forth herein may be independently combined. Similarly, the ranges and amounts for each element of the invention can be used together with ranges or amounts for any of the other elements.

As used herein, the transitional term "comprising," which is synonymous with "including," "containing," or "characterized by," is inclusive or open-ended and does not exclude additional, un-recited elements or method steps. However, in each recitation of "comprising" herein, it is intended that the term also encompass, as alternative embodiments, the phrases "consisting essentially of" and "consisting of" where "consisting of" excludes any element or step not specified and "consisting essentially of" permits the inclusion of additional un-recited elements or steps that do not materially affect the essential or basic and novel characteristics of the composition or method under consideration. The expression "consisting of" or "consisting essentially of," when applied to an element of a claim, is intended to restrict all species of the type represented by that element, notwithstanding the presence of "comprising" elsewhere in the claim.

While certain representative embodiments and details have been shown for the purpose of illustrating the subject invention, it will be apparent to those skilled in this art that various changes and modifications can be made therein without departing from the scope of the subject invention. In this regard, the scope of the invention is to be limited only by the following claims. In certain jurisdictions, recitation of one or more of narrower values for a numerical range or recitation of a narrower selection of elements from a broader list means that such recitations represent preferred embodiments.

What is claimed is:

1. A coating composition comprising:
   (a) an oxidized α-olefin having about 16 to about 40 carbon atoms, said oxidized α-olefin comprising one or more carboxylic acid groups or C1-C28 alkyl esters, such as methyl or butyl ester, of one or more of said carboxylic acids, said α-olefin having been oxidized to an Acid Number of about 10 to about 120 as measured prior to any esterification;
   (b) a hydrocarbon-soluble ester-containing polymer having at least one branch of about 10 to about 36 carbon atoms and having a number average molecular weight of about 5000 to about 300,000;
   (c) a carboxylic acid having at least 10 carbon atoms;
   (d) a salt of an alkylarylsulfonic acid, wherein the alkyl group thereof is of sufficient length to provide solubility of the salt in a hydrocarbon oil;
   (e) an oil in an amount sufficient to dissolve said salt; and
   (f) optionally, a volatile diluent.

2. The coating composition of claim 1 wherein the amount of (a) the oxidized α-olefin is about 15 to about 40 percent by weight, the amount of (b) the hydrocarbon-soluble ester-containing polymer is about 0.1 to about 10 percent by weight, the amount of (c) the carboxylic acid is about 1 to about 8 percent by weight, the amount of (d) the salt of the alkarylsulfonic acid is about 3 to about 30 percent by weight, and the amount of (e) the oil is a hydrocarbon oil present at about 2 to about 80 percent by weight, said percentages being exclusive of the amount of any volatile diluent.

3. The coating composition of claim 1 wherein (a) the oxidized α-olefin has been oxidized to an Acid Number of about 10 to about 100 or about 30 to about 85 prior to esterification.

4. The coating composition of claim 1 wherein (b) the hydrocarbon-soluble ester-containing polymer comprises an alpha-olefin-maleic anhydride ester copolymer, a styrene-maleic anhydride ester copolymer, a fumaric acid-vinyl acetate ester copolymer, or mixtures thereof.

5. The coating composition of claim 1 wherein (c) the carboxylic acid comprises a diacid or a polyacid.

6. The coating composition of claim 1 wherein (d) the salt of the alkylarylsulfonic acid is a metal salt.

7. The coating composition of claim 1 wherein (d) the salt of the alkylarylsulfonic acid contains an alkyl group of 9 or 12 to about 200 carbon atoms, or about 18 to about 100 carbon atoms.

8. The coating composition of claim 1 wherein (e) the oil is a hydrocarbon oil.

9. The coating composition of claim 1 further comprising an unoxidized α-olefin of about 10 or about 16 to about 40 carbon atoms.

10. The coating composition of claim 1 further comprising an oxidized petroleum wax other than an oxidized olefin.

11. The coating composition of claim 1 further comprising a hydrocarbon wax of about 18 to about 75 carbon atoms, or a triglyceride based on one or more fatty acids of 8 to about 24 carbon atoms, or mixtures thereof.

12. The coating composition of claim 1 wherein the volatile diluent is present.

13. A surface coated with the composition of claim 1.

14. A method for providing corrosion protection to a surface, comprising applying thereto the coating composition of claim 1.

15. A film comprising the components of claim 1.

* * * * *